3,034,937
HYDROPULSE FUEL COMPOSITIONS
Frank Clifton McGrew, Wilmington, Del., assignor, by mesne assignments, to the United States of America as represented by the Secretary of the Navy
No Drawing. Filed Oct. 7, 1949, Ser. No. 120,213
3 Claims. (Cl. 149—109)

The present invention relates to hydropulse fuel pastes, and more particularly to a fluid composition of matter which when mixed with water reacts therewith to liberate a gas at a sufficiently rapid rate to act as a jet propelling motive source.

With the increased use of jet propulsion and the recognition of its merit and the advantages to be derived therefrom, it becomes desirable to provide a jet propelling fuel which may be conveniently and advantageously employed as a motive power source of marine objects such as small craft, torpedoes, and the like.

It is, therefore, one object of the present invention to provide such a motive fuel as aforementioned which when mixed with water liberates a gas at a sufficiently rapid rate to move an object by means of jet propulsion, such compositions being herein referred to as hydropulse fuels.

Another object of the present invention is to provide such a hydropulse fuel in a paste or fluid form.

Another object of the present invention is to provide a chemical composition in the form of a paste or fluid which reacts with water to liberate hydrogen gas.

Another object of the present invention is to provide a chemical composition preferably in the form of a paste or fluid which reacts with water to liberate hydrogen gas, wherein the reaction rate may be controlled by varying the components or ratio of components thereof.

Another object of the present invention is to provide a hydropulse fuel or chemical composition having an alkali metal hydride, an alkaline earth metal hydride, or similar substance, such as the hydride of lithium, sodium, potassium, calcium, barium, or strontium, as an active ingredient thereof.

A still further object of the present invention is to provide a hydropulse fuel or chemical composition including an alkali or alkaline earth metal hydride or the like, such as lithium hydride, mixed with a water soluble organic liquid substantially inert toward the hydride as a diluent, and preferably including a wetting agent soluble in the diluent.

It is well known in the chemical art that lithium hydride and other of the more reactive hydrides, such as of the other alkali metals and the alkaline earth metals, react with water to produce hydrogen gas. The specific embodiment of the present invention herein described in detail by way of example contemplates the application of this principle, particularly when employing lithium hydride, for the production of a hydropulse fuel. In order to so employ lithium hydride, means must be provided to control the reaction thereof with water, both from the standpoint of controlling the rate of feed or amount of fuel being mixed with water and of controlling the rate of reaction of a given quantity of fuel with water, to facilitate the harnessing and efficient utilization of the power thus liberated. To this end in the present embodiment, powdered lithium hydride is mixed with a sufficient quantity of a water soluble organic liquid substantially inert toward the hydride as a diluent to obtain a fluid mixture of a paste-like consistency and, in addition, there is preferably added to this mixture a small amount of wetting agent soluble in the organic liquid. The addition of the small amount of wetting agent functions to increase the fluidity of any particular mixture of powdered lithium hydride and organic liquid diluent without substantially affecting the other properties of the mixture and aids in maintaining the suspension of the lithium hydride powder. When in the form of a paste-like fluid, the rate of feed or amount of lithium hydride fed into the reaction chamber may be readily controlled, while the suspension of the lithium hydride powder in said organic liquid operates to diffuse the powder so that when mixed with water the reaction is smooth and uniform. In addition, a control may be exerted over the reaction rate by the ratio of the amount of powder to the amount of a particular organic diluent. Other factors such as the particle size of the powder and the type of inert organic liquid or diluent employed also affect the reaction rate and may be used as a control thereof.

Several examples of particular compositions suitable for accomplishing the objects of the present invention are here stated:

Example 1

One part of powdered lithium hydride of average particle size of 4 microns is intimately mixed with 1.5 parts of triethylamine in an inert moisture-free atmosphere. When mixed with water the resulting fluid paste has a reaction rate of 300 milliseconds.

Example 2

A paste is prepared as in Example 1 but having 0.1 part of soybean lecithin added thereto. The resulting paste has the same rate of reaction with water as that of Example 1, but has the advantage of greater fluidity.

Example 3

A fluid paste is prepared by intimately mixing 55 parts of lithium hydride having an average particle size of 17 microns with 45 parts of ethyleneglycol dimethyl ether. This paste has a reaction rate with water of 700 milliseconds. If desired, a small quantity of about 5 parts of soybean lecithin may be added to this mixture to obtain greater fluidity.

The three foregoing examples are intended merely to be illustrative of the present invention and do not limit it to lithium hydride, the particular powder particle sizes, the organic diluents, the wetting agent, or the proportions of the various component parts there enumerated. Other active ingredients may be employed in this hydrogen producing composition than lithium hydride, such as those mentioned in the earlier portion of the specification. The particle size of the lithium hydride or other active ingredient is not highly critical, but should be small enough to give a homogeneous paste, and to that end should be preferably less than 20 microns. Any organic liquid which is appreciably soluble in water and substantially chemically inert toward the lithium hydride or other active ingredient is a suitable diluent for preparing the hydropulse fuel paste of the present invention, and preferably this liquid diluent should be miscible with water in all proportions. Examples of other liquids that are suitable diluents for the present invention are dioxane, dimethoxytetraethyleneglycol, morpholine, pyridine, isopropylamine, diethylamine, trimethyl phosphate, ethyl acetate, methyl ethyl ketone, and dimethylformamide. The amount of diluent to be employed depends somewhat on its nature and upon the reaction rate desired. It may be stated, however, that a diluent range of between 35 and 70 percent of the weight of the paste forms a suitable mixture for the purposes of the present invention, the limits of the range being determined largely by convenience in obtaining a fluidity permitting the fuel feed and reaction control above described. The soybean lecithin mentioned in Examples 2 and 3 is employed as a wetting agent to obtain greater fluidity of the paste. However, other wetting agents soluble in the above enumerated diluents may be employed such as, for example, "Span 80" (sorbitan monooleate), "Tween 80" (sorbitan monooleate-ethylene oxide reaction product), "Duponol G" (amine salt of dodecylsulfuric acid), and "Retarder LA" (stearyltrimethylammonium bromide). Such agents lower the viscosity of the paste and thus permit the use of less diluent to obtain the desired degree of fluidity, or permit the obtaining of a higher degree of fluidity for a given quantity of diluent, and in addition they also reduce to some extent the tendency of the lithium hydride particles to settle out on standing. Any desired amount of the diluent soluble wetting agent may be employed, a suitable range being 0.5 to 10 percent of the weight of the paste. Although other types of wetting agents which are not diluent soluble may be employed, they are much less satisfactory than those which are diluent soluble.

The composition comprising the present invention may be employed wherever it is desired to liberate substantial quantities of hydrogen gas, as for example, in the use of radio equipped weather analyzing balloons, distress signal and barrage balloons, or in numerous other fields as will be apparent to those skilled in the art. However, as indicated above, it is contemplated that the foremost application of the present invention resides in its use as a hydropulse fuel for jet propelling marine objects such as small craft, torpedoes, and the like. When used to propel small craft through water, the above described paste-like fluid fuel composition may be fed at a desired rate into a water and fuel mixing chamber to liberate the hydrogen gas to jet propel the craft. When used for propelling uncontrolled objects such as torpedoes, a desired quantity of the fuel having a desired reaction rate, as determined by the proportion of lithium hydride to the diluent and the type of diluent, among other factors, may be placed in a mixing chamber in the torpedo, so that upon launching of the torpedo water enters the mixing chamber causing the hydrogen liberating reaction, and resulting in the desired jet propulsion of the torpedo. Other uses of and ways of using the type of composition comprising the present invention, as defined by the following claims, will be apparent to those skilled in the art.

What is claimed is:

1. A composition consisting essentially of a powdered hydride of a metal chosen from the group consisting of alkali and alkaline earth metals, a water soluble organic liquid diluent selected from the group consisting of triethylamine, ethyleneglycol, dimethyl ether, dioxane, dimethoxytetraethyleneglycol, morpholine, pyridine, isopropylamine, diethylamine, trimethyl phosphate, ethyl acetate, methyl ethyl ketone, and dimethylformamide, the selected diluent being chemically inert toward the chosen metal hydride, and a wetting agent soluble in said diluent taken from the group consisting of soybean lecithin, sorbitan monooleate, polyoxyethylene sorbitan monooleate, an amine salt of dodecylsulfuric acid, and stearyltrimethylammonium bromide, said hydride being powdered to a particle size of less than 20 microns, said organic diluent being present in said composition in the amount of from 35 to 70 percent of the weight thereof, said wetting agent being present in said composition in the amount of 0.5 to 10 percent of the weight thereof.

2. A composition consisting essentially of powdered lithium hydride triethylamine, and stearyltrimethylammonium bromide, said lithium hydride being powdered to a particle size less than 20 microns, said triethylamine being present in the amount of 35 to 70 percent of the weight of the composition, said stearyltrimethylammonium bromide being present in the amount of 0.5 to 10 percent of the weight of the composition, and said components being intimately mixed to form a paste-like composition reacting with water when mixed therewith to liberate hydrogen gas.

3. A paste-like fluid composition consisting essentially of powdered lithium hydride of a particle size less than 20 microns, and triethylamine present in the amount of 35 to 70 percent of the weight of the composition, said composition reacting with water when mixed therewith to generate hydrogen gas.

References Cited in the file of this patent

UNITED STATES PATENTS 2,461,797     Zwicky _____ Feb. 15, 1949

OTHER REFERENCES

Mellor: "Comprehensive Treatise on Inorganic and Theoretical Chemistry," vol. 2, page 484, Longmans, Green & Co. London (1922).

Hodgman: "Handbook of Chemistry and Physics" Thirty-first edition, 1949, pages 1106 and 1107, Chemical Rubber Pub. Co., Cleveland, Ohio.

Reich et al.: "Helv. Chem. Act," vol. 3 (1920), pages 138–144.

Porlezza et al.: "Gazz Chem. Ital.," vol. 55 (1925), pages 224–234.

"Surface-Active Agents" in Industrial and Engineering Chemistry, vol. 33, No. 1, January 1941, pages 16–22 inclusive.

UNITED STATES PATENT OFFICE
CERTIFICATE OF CORRECTION

Patent No. 3,034,937                May 15, 1962

Frank Clifton McGrew

It is hereby certified that error appears in the above numbered patent requiring correction and that the said Letters Patent should read as corrected below.

Column 3, line 47, after "ethyleneglycol" strike out the comma; column 4, line 14, after "hydride" insert a comma.

Signed and sealed this 11th day of September 1962.

(SEAL)
Attest:

ERNEST W. SWIDER
Attesting Officer

DAVID L. LADD
Commissioner of Patents